US007241351B2

(12) United States Patent
Osterwalder

(10) Patent No.: US 7,241,351 B2
(45) Date of Patent: Jul. 10, 2007

(54) ASSEMBLING METHOD FOR MOSAICS OF TESSERAE MADE OF TRANSPARENT GLASS AND MOSAIC PORTION

(75) Inventor: Valeria Osterwalder, Lugano (CH)

(73) Assignee: Art Productions Limited, Pieta (MT)

( * ) Notice: Subject to any disclaimer, the term of this patent is extended or adjusted under 35 U.S.C. 154(b) by 0 days.

(21) Appl. No.: 11/206,759

(22) Filed: Aug. 19, 2005

(65) Prior Publication Data

US 2006/0068149 A1 Mar. 30, 2006

(30) Foreign Application Priority Data

Sep. 28, 2004 (EP) .................................. 04023094

(51) Int. Cl.
*B32B 37/00* (2006.01)

(52) U.S. Cl. ........................ 156/63; 156/297; 156/299; 52/388; 428/38; 428/39; 428/542.2

(58) Field of Classification Search .................. 156/63, 156/297, 299; 52/388; 428/38, 39, 542.2
See application file for complete search history.

(56) References Cited

U.S. PATENT DOCUMENTS 313,099 A * 3/1885 Nielson ....................... 52/388
706,874 A * 8/1902 Alcan .......................... 52/388
2,931,751 A * 4/1960 Du Fresne .................. 52/388
4,804,569 A 2/1989 Arisawa et al.
5,102,706 A * 4/1992 Latte .......................... 156/63

FOREIGN PATENT DOCUMENTS

| | | |
|---|---|---|
| DE | 1 389 952 | 4/1975 |
| EP | 1 179 493 B1 | 6/2004 |
| FR | 2 032 231 | 11/1970 |
| FR | 2 303 919 | 8/1976 |
| FR | 2 732 701 | 10/1996 |
| GB | 2052395 A * | 1/1981 |

OTHER PUBLICATIONS

European Search Report dated Mar. 14, 2005 for European Patent Application No. EP 04 02 3094.

* cited by examiner

*Primary Examiner*—Jeff H. Aftergut
(74) *Attorney, Agent, or Firm*—Hogan & Hartson LLP

(57) ABSTRACT

An assembling method for mosaics of tesserae made of transparent glass comprises the phase of gluing a plurality of tesserae on a substratum comprising a transparent cloth to form a mosaic portion suitable for being subsequently glued or fixed to a wall, a floor, or other structures. The substratum comprises a cloth made of fiber glass preferably a cloth comprising 100% of fiber glass. The cloth made of fiber glass is formed with a warp comprising a number of yarns between 215 and 225 yarns/dm. The cloth made of fiber glass is formed with a weft comprising a number of yarns between 215 and 225 yarns/dm.

20 Claims, 1 Drawing Sheet

ASSEMBLING METHOD FOR MOSAICS OF TESSERAE MADE OF TRANSPARENT GLASS AND MOSAIC PORTION

FIELD OF THE INVENTION

The present invention relates to an assembling method for mosaics of tesserae made of transparent glass and to a mosaic portion.

The present invention relates in particular to a method for obtaining a mosaic portion suitable for being subsequently glued or fixed on a wall, floor or other structures.

According to another aspect, the present invention relates to a mosaic portion suitable for being subsequently glued or fixed on a wall, floor or other structures.

BACKGROUND OF THE INVENTION

In the field of mosaics there is a particularly felt need, that is to provide a mosaic portion, i.e. a panel, made by a plurality of mosaic tesserae of transparent glass disposed according to an established drawing. The mosaic portion is the portion of a whole mosaic drawing and it is suitable for being subsequently glued or fixed to a wall, a floor or to other structures, with the other mosaic portions which form the whole mosaic.

There is a further need which is particularly felt in the field of mosaics: showing up the brilliance, the colors and, above all, the transparency of the tesserae made of transparent glass, therefore avoiding that the substratum or other supporting material used for obtaining the mosaic portion being visible.

Attempting to satisfy such a need, it is however always necessary to obtain a mosaic portion having good characteristics of resistance and adhesion to the wall and to its substratum.

The problem addressed by the present invention is to devise an assembling method for mosaics of tesserae made of transparent glass and a mosaic portion which have characteristics such as to fulfill the needs discussed above.

SUMMARY OF THE INVENTION

One embodiment of the present invention provides an assembling method for mosaics of tesserae made of transparent glass. A further embodiment of the present invention provides a mosaic portion.

Dependent claims relate to other possible embodiments of the invention.

BRIEF DESCRIPTION OF THE DRAWINGS

Other features and the advantages of the method and of the mosaic portion according to the present invention will be apparent from the description given below of preferred and non limitative examples of embodiments, with reference to the annexed figures in which.

DETAILED DESCRIPTION OF THE PREFERRED EMBODIMENT OF THE INVENTION

Figure 1:
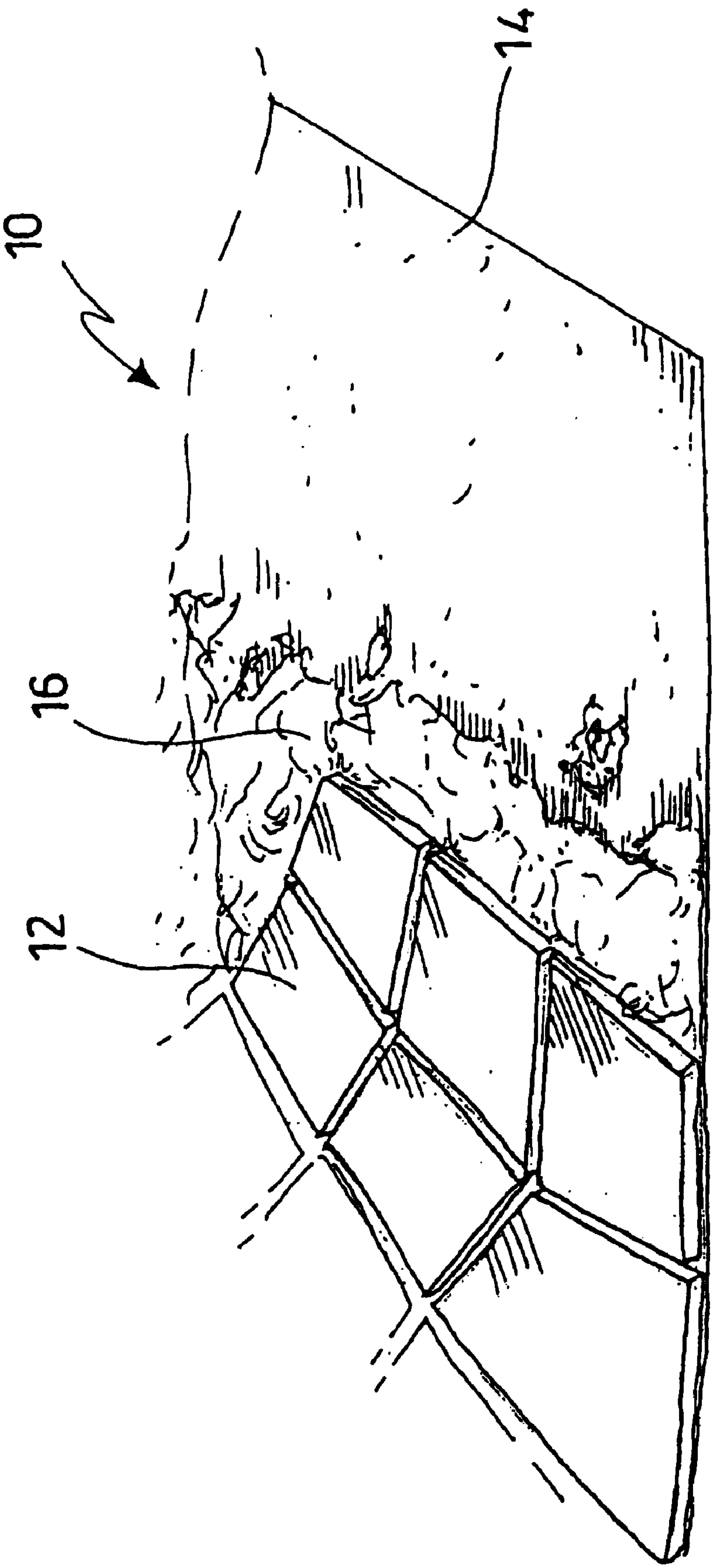
FIG. 1 shows a partially perspective view of a detail of a mosaic portion according to the invention.

With reference to the above mentioned figures, 10 is a general reference for a mosaic portion comprising a plurality of mosaic tesserae 12 made of transparent glass. A mosaic portion is a panel or piece in which the transparent tesserae have been disposed according to an established drawing defining a portion of the drawing of the whole mosaic. Each mosaic portion is suitable for being glued or fixed to a wall, a floor or other structures and all the mosaic portions form the whole mosaic.

Advantageously the mosaic tesserae 12 are glued on a substratum 14 comprising a transparent cloth. According to a preferred embodiment, the substratum comprises a cloth made of fiber glass. More preferably the substratum comprises a cloth comprising 100% of fiber glass.

Advantageously the cloth made of fiber glass is formed with a warp comprising a number of yarns between 200 and 240 yarns/dm, preferably between 215 and 225 yarns/dm.

According to a possible embodiment, the cloth made of fiber glass is formed with a weft comprising a number of yarns between 200 and 240 yarns/dm, preferably between 215 and 225 yarn/dm.

According to a possible embodiment, the raw cloth made of fiber glass weighs about 24 g/m$^2$±5%.

According to a possible embodiment, the raw cloth made of fiber glass has value of the resistance to tensile stress, which corresponds to the value of the ultimate tensile strength relating to the warp, greater than 70 N/cm.

According to a possible embodiment, the raw cloth made of fiber glass has value of the resistance to tensile stress, which corresponds to the value of the ultimate tensile strength relating to the weft, greater than 70 N/cm.

Preferably the cloth has all the characteristics disclosed above.

Advantageously between the transparent cloth and the mosaic tesserae is provided a glue layer 16 having a value of Brokfield viscosity (Sp.4 RPM 10, 200° C.) between about 6.500 Mpa*sec. Preferably the value of the density of the glue layer 16 is about 0.99 g/ml.

According to a possible embodiment, the value of the solid content of the glue layer is between 50% and 52%.

Advantageously the pH value of the glue layer 16 is about 7.2.

According to a possible embodiment the value of the starting tensile strength of the glue layer 16 is about 1.7 Mpa.

Advantageously the value of the starting tensile strength of the glue layer 16 after treatment with water is about 1.3 Mpa.

More preferably the glue has all the characteristics disclosed above.

According to another aspect, the present invention relates to an assembling method for mosaic of tesserae made of transparent glass in which a plurality of tesserae 12 are glued on a substratum 14 comprising a transparent cloth in order to obtain a mosaic portion 10 suitable for being subsequently glued or fixed on a wall, a floor or another structure. Preferably the tesserae 12 are glued on a substratum comprising a cloth made of fiber glass. More preferably the substratum comprises a cloth comprising 100% of fiber glass.

Advantageously the cloth made of fiber glass is formed with a warp comprising a number of yarns between 200 and 240 yarns/dm, preferably between 215 and 225 yarns/dm.

According to a possible embodiment, the cloth made of fiber glass is formed with a weft comprising a number of yarns between 200 and 240 yarns/dm, preferably between 215 and 225 yarn/dm.

According to a possible embodiment, the tesserae 12 are glued on a raw cloth made of fiber glass which weighs about 24 g/m$^2$±5%.

According to a possible embodiment, in the method according to the present invention it is chosen a raw cloth made of fiber glass having a value of the resistance to tensile stress, which corresponds to the value of the ultimate tensile strength relating to the warp, greater than 70 N/cm.

According to a possible embodiment, in the method according to the present invention it is chosen a raw cloth made of fiber glass having a value of the resistance to tensile stress, which corresponds to the value of the ultimate tensile strength relating to the weft, greater than 70 N/cm.

Preferably the cloth has all the characteristics disclosed above.

Advantageously in the phase of gluing the transparent cloth and the mosaic tesserae is used a glue having a value of Brokfield viscosity (Sp.4 RPM 10, 20° C.) between about 6.500 Mpa*sec and 7.500 Mpa*sec. Preferably the value of the density of the glue layer 16 is about 0.99 g/ml.

According to a possible embodiment, in the gluing phase between the transparent cloth and the mosaic tesserae is used a glue having a value of the solid content between 50% and 52%.

Advantageously in the gluing phase between the transparent cloth and the mosaic tesserae is used a glue having a pH value about 7.2.

According to a possible embodiment in the gluing phase between the transparent cloth and the mosaic tesserae is used a glue having a value of the starting tensile strength of about 1.7 Mpa.

Advantageously in the gluing phase between the transparent cloth and the mosaic tesserae is used a glue having a value of the starting tensile strength after treatment with water of about 1.3 Mpa.

More preferably the glue has all the characteristics disclosed above.

From what has been disclosed above, it is clear that a method and a mosaic portion according to the present invention allows to satisfy the above mentioned need, that is having a panel with an established drawing suitable to form a whole mosaic in which the substratum is not visible through the tesserae made of transparent glass.

This feature is particularly advantageous in the known uses of mosaics made by tesserae of transparent glass and moreover it makes possible new ways of use of the mosaics. For example due to a transparent substratum the mosaics made by transparent glass tesserae may be used in order to obtain new bright effects. Due to the use of a transparent cloth, it is possible to arrange the panel on a rigid transparent substratum (glass plate, plexiglas, polycarbonate, . . . ) by means of a transparent silicone, and to retro-illuminate it in order to from a wall, a floor, a decor or other structures.

Due to the use of a cloth made of a transparent material it is possible to satisfy the above mentioned need and in particular due to the use of a cloth made of fiber glass it is possible to obtain good characteristics of resistance and gluing both between the tesserae and the substratum and between the substratum and the wall.

Due to the use of a cloth having the characteristics mentioned above it is possible to have a particular aesthetic effect and optimal strength characteristics of the mosaic portion and of the whole mosaic formed by a plurality of mosaic portions.

The strength characteristics are further improved using a glue ad disclosed above.

Clearly, other variants and/or additions may be provided for the embodiments described and illustrated above.

Clearly, a person skilled in the art can, in order to meet contingent and specific requirements, make numerous modifications and variations, all such modifications and variations being contained within the scope of protection of the invention as defined in the following claims.

What is claimed is:

1. Assembling method for mosaics of tesserae made of transparent glass comprising the phase of gluing a plurality of tesserae on a substratum comprising a transparent fiberglass cloth formed with a warp comprising a number of yarns between 215 and 225 yarns/dm to form a mosaic portion suitable for being subsequently glued or fixed to a wall, a floor, or other structures.

2. Assembling method according to claim 1 wherein the substratum comprises a cloth comprising 100% of fiber glass.

3. Assembling method according to claim 1 wherein the cloth made of fiber glass is formed with a weft comprising a number of yarns between 200 and 240 yarns/dm.

4. Assembling method according to claim 3 wherein the cloth made of fiber glass is formed with a weft comprising a number of yarns between 215 and 225 yarns/dm.

5. Assembling method according to claim 1, wherein the raw cloth made of fiber glass weighs about 24 $g/m^2 \pm 5\%$.

6. Assembling method according to claim 1, wherein the raw cloth made of fiber glass has a value of the resistance to tensile stress, which corresponds to the value of the ultimate tensile strength relating to the warp greater than 70 N/cm.

7. Assembling method according to claim 1, wherein the raw cloth made of fiber glass has a value of the resistance to tensile stress, which corresponds to the value of the ultimate tensile strength relating to the weft greater than 70 N/cm.

8. Assembling method according to claim 1, wherein the phase of gluing the transparent cloth and the mosaic tesserae is obtained by means of a glue layer having a value of Brookfiel viscosity (Sp.4 RPM 10, 20° C.) between about 6.500 Mpa*sec and 7.500 Mpa*sec.

9. Assembling method according to claim 1, wherein the phase of gluing the transparent cloth and the mosaic tesserae is obtained by means of a glue layer having a value of density about 0.99 g/ml.

10. Assembling method according to claim 1, wherein the phase of gluing the transparent cloth and the mosaic tesserae is obtained by means of a glue layer having a value of solid content between 50% and 52%.

11. Assembling method according to claim 1, wherein the phase of gluing the transparent cloth and the mosaic tesserae is obtained by means of a glue layer having a pH value about 7.2.

12. Assembling method according to claim 1, wherein the phase of gluing the transparent cloth and the mosaic tesserae is obtained by means of a glue layer having a value of the starting tensile strength about 1.7 Mpa.

13. Assembling method according to claim 1, wherein the phase of gluing the transparent cloth and the mosaic tesserae is obtained by means of a glue layer having a value of the starting tensile strength after treatment with water about 1.3 Mpa.

14. Assembling method according to claim 1 wherein a mosaic portion is glued on a rigid transparent substratum and is retro-illuminated.

15. Assembling method according to claim 14 wherein the rigid substratum is made by a plate of a material selected between glass, plexiglas, polycarbonate.

16. Assembling method according to claim 14 wherein the mosaic portion is glued on the rigid transparent substratum by means of a transparent silicone.

17. Assembling method for mosaics of tesserae made of transparent glass comprising the phase of gluing a plurality of tesserae on a substratum comprising a transparent fiberglass cloth formed with a warp comprising a number of yarns between 215 and 225 yarns/dm and having a raw weight of about 24 $g/m^2 \pm 5\%$ to form a mosaic portion suitable for being subsequently glued or fixed to a wall, a floor, or other structures.

18. Assembling method for mosaics of tesserae made of transparent glass comprising the phase of permanently gluing a plurality of tesserae on a substratum comprising a transparent cloth to form a mosaic portion suitable for being subsequently glued or fixed to a wall, a floor, or other structures, wherein the mosaic of tesserae maintains its transparency after it is glued or fixed to the wall, floor, or other structures.

19. Assembly method according to claim 18 wherein the mosaic portion is adhered to a rigid transparent substratum, wherein the mosaic or tesserae maintains its transparency after it is adhered to the rigid transparent substratum.

20. Assembling method according to claim 19, wherein the mosaic portion is retro-illuminated.

* * * * *